US008030194B2

(12) United States Patent
Amirav et al.

(10) Patent No.: US 8,030,194 B2
(45) Date of Patent: Oct. 4, 2011

(54) SPRAY METHOD FOR PRODUCING SEMICONDUCTOR NANO-PARTICLES

(75) Inventors: Lilac Amirav, Hod Hasharon (IL); Efrat Lifshitz, Haifa (IL)

(73) Assignee: Technion Research and Development Foundation Ltd., Haifa (IL)

(*) Notice: Subject to any disclaimer, the term of this patent is extended or adjusted under 35 U.S.C. 154(b) by 556 days.

(21) Appl. No.: 11/663,454

(22) PCT Filed: Sep. 22, 2005

(86) PCT No.: PCT/IL2005/001013
§ 371 (c)(1),
(2), (4) Date: Jul. 6, 2009

(87) PCT Pub. No.: WO2006/035425
PCT Pub. Date: Apr. 6, 2006

(65) Prior Publication Data
US 2009/0263956 A1    Oct. 22, 2009

Related U.S. Application Data

(60) Provisional application No. 60/612,830, filed on Sep. 27, 2004.

(51) Int. Cl.
*H01L 21/00* (2006.01)
(52) U.S. Cl. .................. 438/584; 977/840; 257/E21.001
(58) Field of Classification Search ............. 438/758, 438/584; 977/773, 774, 813, 840, 891, 900; 427/446, 452; 257/E21.001
See application file for complete search history.

(56) References Cited

U.S. PATENT DOCUMENTS

| 5,997,956 | A  | * | 12/1999 | Hunt et al. ............... 427/446 |
| 6,581,415 | B2 |   | 6/2003  | Chandra et al. |
| 6,601,776 | B1 | * | 8/2003  | Oljaca et al. ................ 239/5 |
| 6,623,559 | B2 |   | 9/2003  | Huang |
| 7,771,798 | B1 | * | 8/2010  | Grosse et al. ............. 427/569 |
| 7,909,263 | B2 | * | 3/2011  | Marshall .................... 239/10 |
| 2003/0106488 | A1 | * | 6/2003 | Huang et al. ............... 117/68 |
| 2003/0180029 | A1 | * | 9/2003 | Garito et al. .............. 385/142 |
| 2003/0219544 | A1 | * | 11/2003 | Smith et al. .............. 427/446 |
| 2003/0221589 | A1 | * | 12/2003 | Lee et al. ................. 106/401 |
| 2004/0065170 | A1 | * | 4/2004  | Wu et al. ................. 75/10.13 |
| 2004/0101617 | A1 | * | 5/2004  | Devi et al. ................ 427/66 |
| 2004/0178529 | A1 | * | 9/2004  | Reverchon ................... 264/5 |
| 2010/0283005 | A1 | * | 11/2010 | Pickett et al. ......... 252/301.6 S |

OTHER PUBLICATIONS

Murray et al., "Synthesis and Characterization of Mondisperse Nanocrystals and Close-Packed Nanocrystal Assemblies", Annual Reviews Material Science vol. 30 (2000): pp. 545-610.*

* cited by examiner

*Primary Examiner* — Matthew Smith
*Assistant Examiner* — Michele Fan
(74) *Attorney, Agent, or Firm* — Browdy and Neimark, PLLC

(57) ABSTRACT

A method is provided for producing semiconductor nanoparticles comprising: (i) dissolving a semiconductor compound or mixture of semiconductor compounds in a solution; (ii) generating spray droplets of the resulting solution of semiconductor compound(s); (iii) vaporizing the solvent of said spray droplets, consequently producing a stream of unsupported semiconductor nanoparticles; and (iv) collecting said unsupported semiconductor nanoparticles on a support.

26 Claims, 4 Drawing Sheets

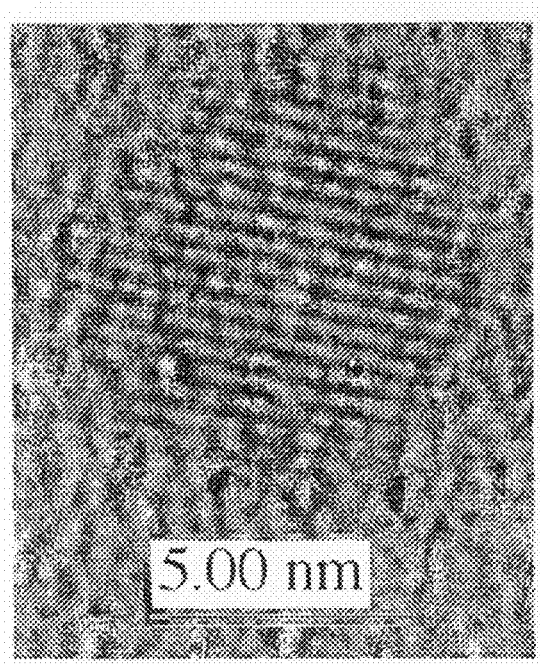
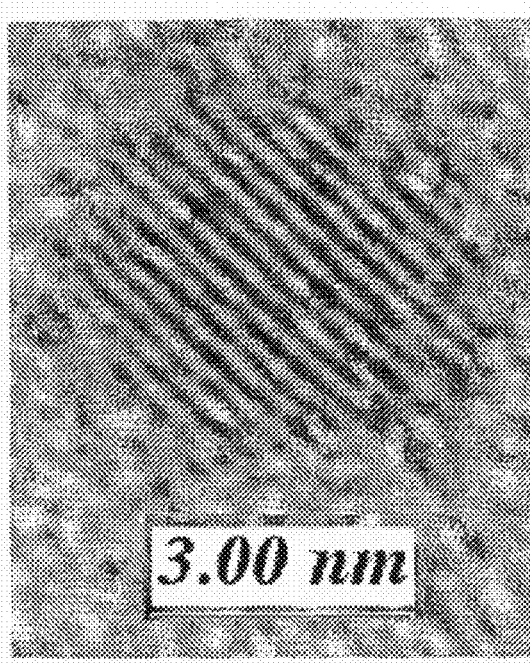
Fig. 3A          Fig. 3B
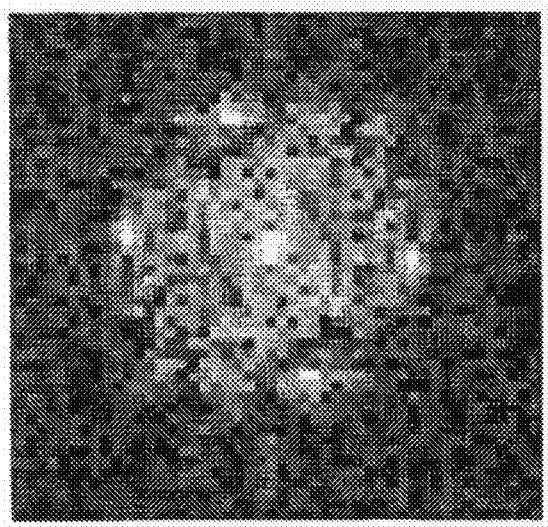
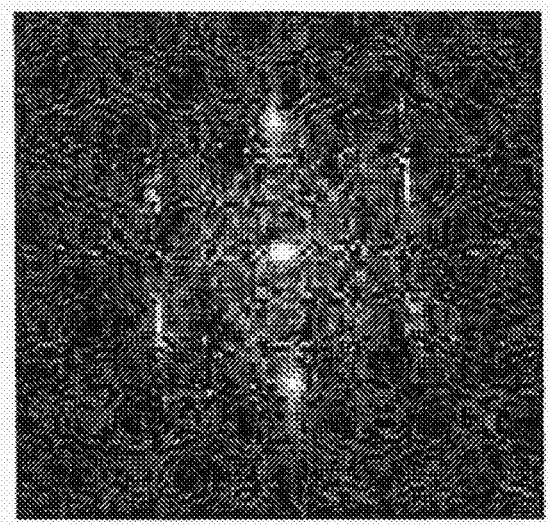
Fig. 4

… (continued)

SPRAY METHOD FOR PRODUCING SEMICONDUCTOR NANO-PARTICLES

FIELD OF THE INVENTION

The present invention relates to a method for producing semiconductor nanoparticles.

BACKGROUND OF THE INVENTION

In the last two decades significant attention has been devoted to the physics of low dimensional semiconductor structures. Among those, semiconductor nanoparticles are of particular interest, due to the pronounced influence of the three-dimensional size confinement on their electronic and optical properties. Extensive effort has been devoted for the production of high quality semiconductor nanoparticles, motivated by their potential use in new and emerging technologies.

Currently, there are two main methods for the fabrication of semiconductor nanoparticles, namely epitaxial growth and colloidal chemistry techniques. Epitaxial growth of nanoparticles on top of a substrate with a different lattice constant leads to strain induced three-dimensional islands, known as Stranski Krastanow (SK) quantum dots.

The SK method produces relatively large dots, with weak quantum confinement, and with size fluctuation, neighboring islands coalescence, compositional in-homogeneity and unresolved physics preventing reproducible and uniform results. This method requires ultra high vacuum as well as other complex and expensive equipment. Furthermore, the liberty to choose the substrate is limited.

The colloidal method enables the reproducible but not continued formation of nanoparticles, with a variety of sizes and shapes, with initial distributions of $10<\sigma<20\%$ in diameter, and with some control on surface properties, but it does not allow doping of the nanoparticles. Furthermore, the organic capping has a key role in any self-assembly created by these nanoparticles and prevents a highly packed structure and induces undesirable and hard to control surface properties due to the role of the ligands (namely, the organic molecules attached to the nanoparticle surface as a monolayer through covalent, dative or ionic bonds).

SUMMARY OF THE INVENTION

The present invention relates to a method for producing semiconductor nanoparticles comprising: (i) dissolving a semiconductor compound or mixture of semiconductor compounds in a solution; (ii) generating spray droplets of the resulting solution of semiconductor compound(s); (iii) vaporizing the solvent of said spray droplets, consequently producing a stream of unsupported semiconductor nanoparticles; and (iv) collecting said unsupported semiconductor nanoparticles on a solid support.

In a preferred embodiment, the semiconductor compound or mixture of compounds is a salt or a mixture of salts.

The method provided by the present invention produces high quality nanoparticles that are characterized by several new and unique features and advantages not exhibited by nanoparticles produced by currently available methods.

This method is typically further characterized in that the collected semiconductor nanoparticles on the solid support are ordered nanocrystals, wherein said semiconductor nanocrystals have a diameter of less than 30 nm and more than 0.5 nm, with diameter standard deviation of less than 20%.

The semiconductor nanoparticles average size and size distribution is controlled through several spray production parameters and the semiconductor compound concentration in its solution. The spray droplets can be generated by different techniques such as thermospray, electrospray, pneumatic nebulization, or pneumatic assisted thermospray. Thermospray is preferably based on direct electrical heating of the solution by passing an electrical current along a capillary through which the solution is passing. For scale-up of the nanoparticle production, the spray droplets of the solution of semiconductor compound can be produced by an array of multiple tube spray sources.

The semiconductor nanoparticles can be pure semiconductor, or doped with either paramagnetic centers or extra carriers. Alternatively, the semiconductor nanoparticles are characterized by having a core-shell structure, with materials, at least one of which is a semiconductor.

The step of collecting the unsupported semiconductor nanoparticles on a solid support typically produces a highly closed packed array. Alternatively, it can be used for producing a two or three-dimensional array of said nanoparticles. Said solid support may be heated and maintained at a selected temperature to prevent adverse liquid solvent effects.

BRIEF DESCRIPTION OF THE FIGURES

FIG. 1 shows schematic illustration of a pneumatic assisted thermospray apparatus used according to the invention.

FIG. 2 is an illustration of the semiconductor nanoparticles production from the spray.

FIGS. 3A-3B show high resolution transmission electron microscopy (HRTEM) images of two CdS nanocrystals produced by pneumatic assisted thermospray.

FIG. 4 shows the fast Fourier transform (FFT) of CdS nanocrystals with zinc blend cubic structure produced by pneumatic assisted thermospray.

DETAILED DESCRIPTION OF THE INVENTION

Figure 5:
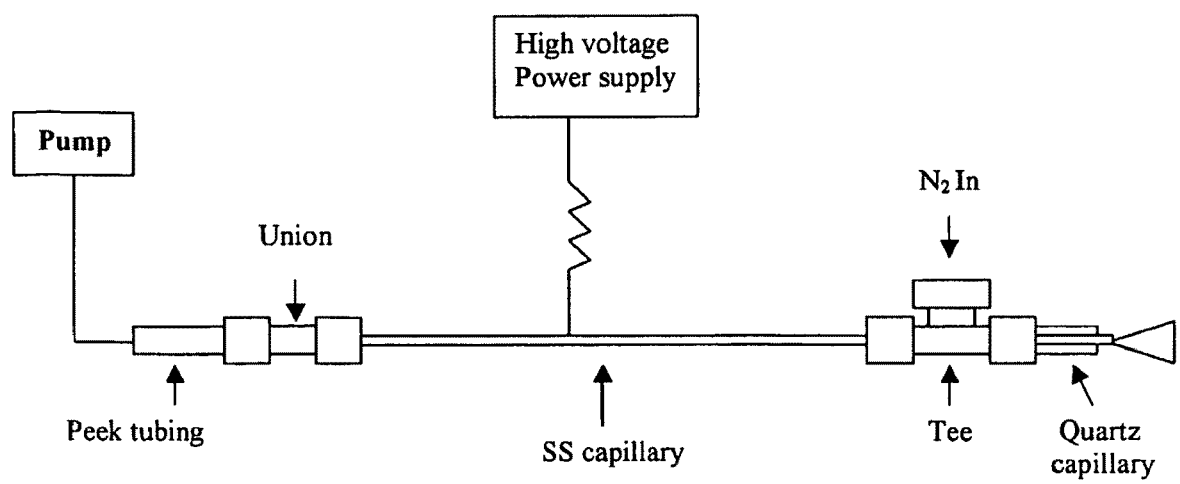
FIG. 5 shows schematic illustration of a pneumatic assisted electrospray apparatus used according to the invention.
Figure 5B:
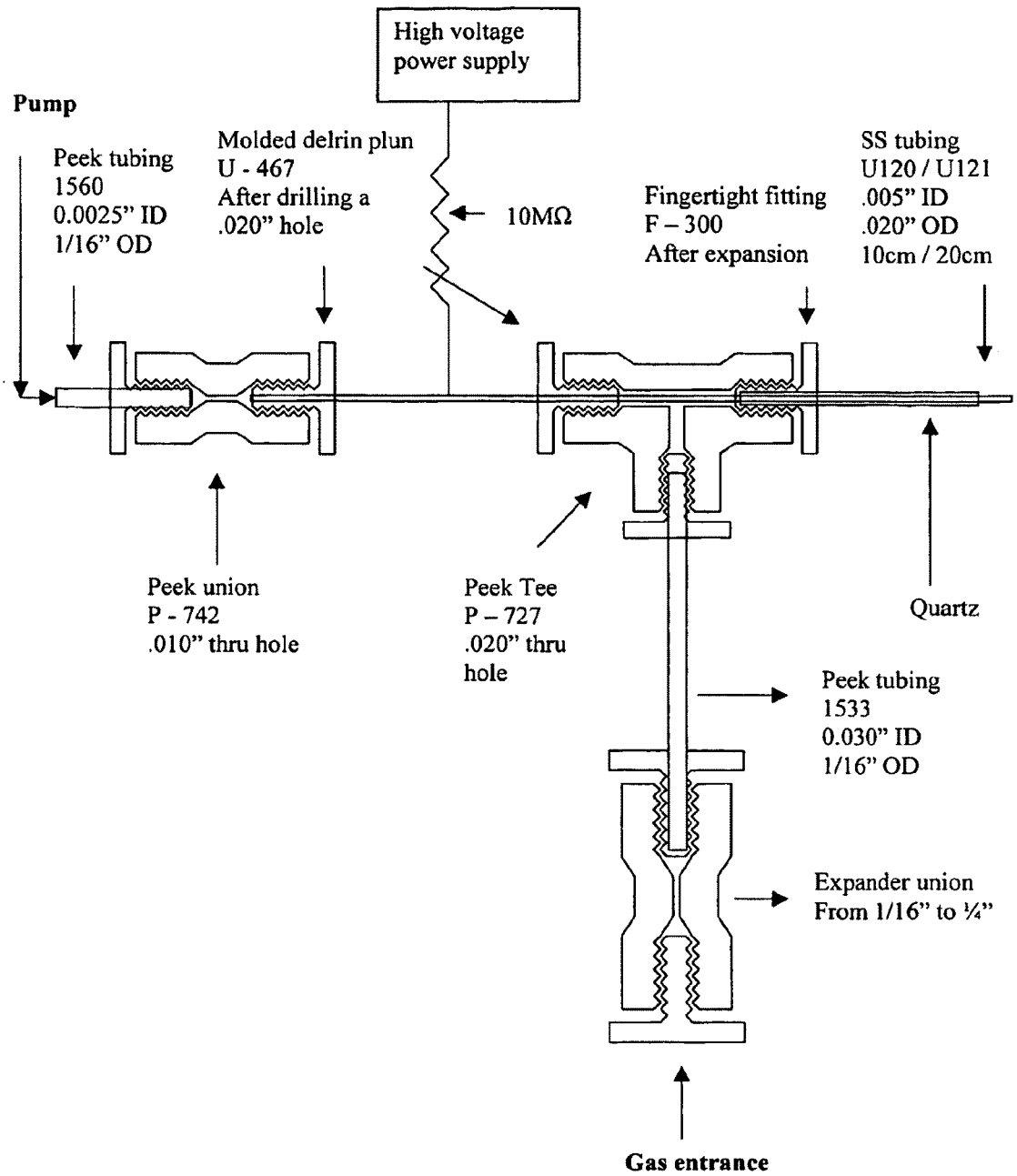

In one aspect, the present invention provides a method for producing semiconductor nanoparticles comprising: (i) dissolving a semiconductor compound or mixture of semiconductor compounds in a solution; (ii) generating spray droplets of the resulting solution of semiconductor salt(s); (iii) vaporizing the solvent of said spray droplets, consequently producing a stream of unsupported semiconductor nanoparticles; and (iv) collecting said unsupported semiconductor nanoparticles on a solid support.

The semiconductor compound or mixture of compounds may be a salt or mixture of salts, and may be selected from semiconductor salts such as II-VI (ZnS, ZnSe, ZnTe, CdS, CdSe, CdTe, HgS, HgSe, MgTe, MnS), III-V (GaN, GaP, GaAs, GaSb, InN, InP, InAs, InSb, AlN, AlP, AlAs, AlSb) or IV-VI (PbS, PbSe, PbTe) semiconductors, which are commercially available. The semiconductor compound can be dissolved either in the form of an ionic salt or as intact non-ionized compound in the solution and even as an aggregate of such compounds. In a preferred embodiment, the semiconductor is CdS.

In one embodiment, one or more metal oxides such as, but not limited to, PbO, ZnO, CdO, MgO, MnO, PbO2, and CuO, can be added to the semiconductor compound solution.

The solvent is selected according to the semiconductor compound used. According to the present invention, a solution of the semiconductor compound or mixture of compounds is initially prepared by directly dissolving said compounds in the appropriate solvent. This solution-based procedure is simple, cheap and requires only a small amount of starting material. It further avoids prolonged handling of hazardous precursors as required in known colloidal procedures.

The generation of spray droplets of the solution of semiconductor compound(s) enables the controlled formation of monodispersed droplets with an average diameter in the range of a few microns to submicron. The concept of the spray process assumes that one droplet forms one product nanoparticle upon the full vaporization of the liquid. The average diameter of the final nanoparticles can be both controlled and determined by the droplet size and the solute concentration of the sprayed solution.

Upon solvent evaporation, the nascent spray droplets become a stream of semiconductor nanoparticles. The nanoparticles in the stream are unsupported, unlike colloidal nanoparticles, which are surrounded by organic surfactant and are immersed in liquid, or epitaxial nanoparticles, which are embedded into their substrate. The unsupported semiconductor nanoparticles can, for the first time according to the present method, be collected on any desired solid (and even liquid) support. This unique feature namely, the possibility to use any support, opens new and interesting opportunities for the incorporation of semiconductor nanoparticles in a variety of applications, such as but not limited to, conductive polymers for photovoltaic cells, Silicon wafer for microelectronic applications, optical lenses for various optical uses, etc.

The method of the present invention is further characterized in that the collected semiconductor nanoparticles may be in the form of ordered nanocrystals.

As used herein, the term "nanocrystals" refers to structures with well-characterized crystalline cores, whereas the more general term "nanoparticles" is used herein to denote amorphous or inherently multidomain inorganic core. High crystallinity is essential for most of the semiconductor nanoparticles applications. It has been shown that amorphous/crystalline transition enhances the quantum efficiency of the material. Structural defects such as dislocations and twin boundary known as carrier captures, result in a broad, unwanted fluorescence red shifted to the excitonic emission. Furthermore, every application involving aspects of conductivity requires well-ordered crystal structure.

In accordance with one embodiment of the present invention, the semiconductor nanoparticles have a diameter within the range of about 0.5 nm to about 30 nm, with diameter standard deviation of less than 20%. Preferably, the semiconductor nanoparticles have a diameter within the range of 2 nm to 10 nm. When the diameter of a semiconductor nanoparticle approaches the size of the exciton Bohr radius, the motion of the electrons and holes becomes confined in the nanoparticle. A created electron-hole pair can only 'fit' into the nanoparticle when the charge carriers are in a state of higher energy. This effect alters the electronic properties of the semiconductor nanoparticle by splitting the bulk energy bands into discrete states, and shifting the lowest excited state to higher energies, with decreasing dot size. These phenomena are well established and known as quantum size effect or quantum confinement effects. Due to the quantum size effect, the electronic and optical properties of the semiconductor nanoparticles vary with the nanoparticle size. The exciton Bohr radius for semiconductors is in the range of a few nanometers (from 2.5 nm for CdS, 18 nm for PbS, and up to 46 nm for PbSe). Thus, semiconductor nanoparticles are quantum confined only when their average diameter decreases below their Bohr radius, which for most semiconductors means below 30 nm.

Due to the strong influence of the nanoparticles size on their properties, monodispersed nanoparticles are required. Preparation of monodispersed samples enables systematic characterization of structural, electronic, and optical properties of semiconductors as they evolve from molecular to bulk in the nanometer size range. Although the strict definition of monodispersed particles requires that the particles be identical or indistinguishable, a relaxed definition is used herein. Thus, according to the present invention, samples with standard deviations of less than 20% in nanoparticles diameter are referred to as monodispersed. Further narrowing of the sample monodispersity can be done by optical means, through selective excitation of only a fraction of the sample. The more preferable standard deviation of 5-10% corresponds to ± one lattice constant throughout the 1-15 nm size range.

In the size range of 0.5-30 nm, statistical size fluctuations of the nanoparticles restrict the size distribution function to more than 5%. In addition, the production of monodispersed semiconductor nanoparticles in the range of 0.5-30 nm is much harder than the production of standard size or even sub-micron larger particles. The production of monodispersed spray can be adversely affected by a variety of hard-to-control parameters such as temperature gradients, vaporizer edge effects, long-term stability of all the controlling parameters including concentration, temperatures, flow rates of both solvent and nebulizing gas, etc. Furthermore, highly precise control of low solvent flow rate is needed for extended period. Also, due to the low solvent flow rate, prolonged stable collection time is required.

Through accurate control of the spray droplet diameters and compound concentration, nanoparticles can be generated in the size range indicated above. However, for the typically needed small nanoparticles sizes, very low compound concentrations are needed, which requires very clean solvents without any traces of non-volatile impurities, which can adversely affect the electronic properties of the nanoparticles through undesirable and uncontrolled doping.

In addition, nanoparticles are chemically reactive, especially in the sub 30 nm diameter range, due to a very high ratio of active surface area to bulk volume. For example, small size nanoparticles can be easily oxidized or coalesce into bigger conglomerated particles. Thus, the nanoparticles production should preferably be quick and under controlled environment.

There are two main different ways for gaining size control of the semiconductor nanoparticles: controlling the droplets size per constant concentration of said solution or varying the concentration for specific droplets diameter. A linear relationship between the third power of the nanoparticles diameter and the dilution factor is expected. Decreased flow rate and increased solution conductivity or applied electric field represent useful routes for the production and control of very small droplets, produced by electrospray, as suggested by Pfeiffer and Hendricks, and Fernandez de la Mora and Locertales (Pfeiffer, R. J. and Hendricks, C. D. (1968) *AIAAS* 6: 496-502; dela Mora J. F. and Locertales, I. G., (1994) *J Fluid Mech.* 243: 561). For thermospray, nanoparticle diameters shift to smaller sizes as the control temperature or liquid flow rate are increased, as well as when the internal diameter of the vaporizer is decreased. Capillary lengths, inner and outer diameters, as well as the opening geometrical shape, are additional parameters that may contribute to droplet size. In thermospray, the length of the heated part and its relative location are further parameters for droplet size manipulation.

Different types of pneumatic assisted spray could also affect said nanoparticles diameter through its influence on the spray droplet size.

Thus, in one embodiment of the invention, the semiconductor nanoparticles average size and size distribution are controlled by spray production parameters.

In another embodiment, the semiconductor nanoparticles average size and size distribution are controlled by the semiconductor compound concentration in the solution.

According to one preferred embodiment of the present invention, the spray droplets of the semiconductor salt solution are generated by thermospray. Thermospray is a technique for generating spray, which has found important practical applications as an interface between liquid chromatography and mass spectrometry. Thermospray can be defined as controlled, partial vaporization of a liquid as it flows through a heated tube. Often direct electrical heating is used, in which the power required to vaporize the liquid is supplied by passing an electrical current through the capillary tube itself. This method of resistively heated capillary was successfully employed in particle beam liquid chromatography mass spectrometry instrumentation named "Therma-Beam". The vapour so produced acts as a nebulizing 'gas' and aids the break up of the liquid stream into droplets, in a process similar to pneumatic nebulization. The solution leaves the tube as a supersonic jet or spray of very small droplets in solvent vapor. Qualitatively, the droplets appear with a moderately narrow particle size distribution.

In a preferred embodiment, the thermospray technique thus employed is based on direct electrical heating of the solution by passing an electrical current through a capillary in which said solution is passing.

Thermospray also produces the largest volume of desolvated particles in comparison to other methods such as pneumatic nebulization, and ultrasonic nebulizer. The primary droplets produced by thermospray under optimal conditions are smaller on the average than those produced by pneumatic nebulizers. Solvent vaporization is enhanced for smaller droplets and higher temperatures, with both aspects leading to faster size reduction due to solvent evaporation than would occur with pneumatic nebulization at room temperature The heating process can be precisely controlled and optimized for different solvents and various flow rates. Through electric current control of the temperature and degree of intra-tube solvent vaporization, the droplet size and characters can be manipulated. Smaller droplets will also result by decreasing the diameter of the thermospray capillary.

It is well known that as the temperature of the thermospray is increased, the droplets size distribution shifts to smaller sizes. As compound(s) is (are) added, the droplets size distributions shifts to larger diameters, but can be decreased by increasing the operating temperature of the vaporizer.

Primary droplets size for a stainless steel thermospray system depends on the percent of vaporization (thermospray control temperature), capillary internal and outer diameters, solvent characteristics (mostly volatile organics) and liquid flow rate. Median droplets diameters are shifted to smaller sizes as the control temperature or liquid flow rate increases, as well as when the internal diameter of the vaporizer is decreased.

Solvent type is another factor that has a significant effect on droplets characteristics. Thus, primary size distributions shifted to smaller diameters as solvent volatility increased. Further, solvent transport increased dramatically, and to a lesser extent, the dissolved component mass transport increased, with more volatile solvents. Thermospray ability to produce relatively small droplet with narrow particle size distribution, and the capability to tune these characters by control over temperature, capillary parameters, and liquid flow rate, have made it promising for the production of semiconductor nanoparticles as described by the present invention.

In another preferred embodiment, the spray droplets of the semiconductor salt solution are generated by pneumatic assisted thermospray. The pneumatic assisted thermospray holds all of the advantages described for thermospray with some more new interesting aspects. The most important of which is the role of the gas flow in spreading the droplets, preventing aggregation of the semiconductor nanoparticles. Furthermore, the gas can be heated to improve solvent vaporization; it may assist in focusing the spray droplets to the solid support; and improve the spray quality (narrow droplets size distribution and stability).

According to another preferred embodiment of the present invention, the generation of the spray droplets of the solution of semiconductor salt is accomplished by electrospray. Electrospray (ES) is a method by which very fine liquid droplets are generated through electrostatic charging. Electrospray is based on the application of a high electric field to the tip of a capillary containing a flowing solution. In ES a cone is formed near the exit of the capillary, so-called Taylor cone, and if the applied field is sufficiently high, a fine jet emerges from the cone tip, which spontaneously breaks up into small charged droplets. These droplets can be either positively or negatively charged depending on the polarity of the capillary voltage. The charged droplets drift through the air downfield, toward a counter electrode and are also affected by the pneumatic flow field.

Pffeifer and Hendricks derived a theoretical equation that predicts the dependence of the droplets radius on experimental parameters:

$$R = \left( \frac{3\varepsilon\gamma^{1/2} V_f}{4\pi\varepsilon_0^{1/2} KE} \right)^{2/7}$$

wherein $\gamma$ is the surface tension of solvent, $\epsilon$ is the permittivity of solvent, $\epsilon_0$ is the permittivity of vacuum, K is the conductivity of solution, E is the applied electric field at capillary tip, R is the radius of droplets produced, and $V_f$ is the flow rate (volume/time). Though this equation was obtained on the basis of unproven assumptions, the predictions are supported by later semi-empirical derivations.

De la Mora and Locertales have proposed the following relationship, on the basis of experimental measurements of the droplet sizes, and theoretical reasoning:

$$R \approx (V_f \epsilon / K)^{1/3}$$

Although these equations appear to be quite different, they predict a very similar dependence of the droplet radius on two of the most important experimentally variable parameters—the flow rate and the conductivity. These equations predict that the droplet radius should increase with the flow rate and decrease as the conductivity K is increased. Decreases of flow rate and increases of conductivity represent a useful route for the production of very small droplets.

The cone jet mode described is only one of the possible ES modes; other modes are designated as dripping, multijet, microdripping, simple jet, ramified jet and spindle. The spraying mode depends on the capillary voltage (its polarity and magnitude) and flow rate, for a liquid of given physical properties. However, the cone jet mode is considered the most stable one and is the best characterized mode in the electrospray literature. On the other hand, if relatively large droplets are desired due to low solubility of the semiconductor salt, ES can be used at low capillary voltage mode for the production of such large droplets.

Electrospray ability to produce extremely small droplets and the ability to control droplet size by experimental parameters such as liquid flow rate and applied electric field, have made it promising for the production of semiconductor nanoparticles.

According to a preferred embodiment of the present invention, the semiconductor nanoparticles are produced each from a single spray droplet. While the spray produced droplets are moving forward, at a certain point in time (after the droplet formation) and space, due to their evaporation, the compound concentration can reach the point of over saturation and compound inner-droplet precipitation will spontaneously occur. Such spontaneous precipitation occurs within isolated droplets during their flight as unsupported single droplets. Furthermore, while such precipitation can lead to the production of an amorphous nanoparticle from a given single droplet, most often, due to simple thermodynamic considerations such as reduction of surface free energy, it will lead to the production of well-organized crystalline form of the nanoparticles.

Since the evaporation process is gradual, precipitation can begin separately for a given compound in a solution with a mixture of compounds. This result in the further production of mixed salts layers (alloyed shell) and even pure different compounds layers (core-shell or core-multi shell structures) in a given single nanoparticle.

According to a preferred embodiment of the present invention, the semiconductor nanoparticles are pure semiconductors. In accordance with the present method and assuming the use of pure solvent and/or semiconductor salt without traces of non-volatile impurities, spontaneous single drop evaporation can lead to the production of pure semiconductor nanoparticle without any organic or inorganic contaminations. The nanoparticles must be monodispersed not only in terms of size distribution but also in terms of internal structure and surface chemistry. Unwanted contaminations can alter or even quench the nanoparticles luminescence, which is one of the major scientific probing tools and characteristic feature that stands at the heart of most semiconductor nanoparticles applications. Furthermore, the lack of organic shell that is inherent to the alternative colloidal synthesis, offers the possibility of creating a truly closed packed array. This unique feature opens new, exciting and highly useful regimes for the research of energy and charge transfer.

In accordance with another embodiment of the present invention, the semiconductor nanoparticles are doped semiconductors. As mentioned above, if mixed compounds of a semiconductor and other compounds are used in said solution, doped semiconductor nanoparticles can be produced, whose spatial and radial concentrations of various doping may depend and be controlled by the relative solubility and concentration of these doping agents. Modern semiconductor technology has been developed due to the ability to control the number of carriers (electrons and holes) that are available in the semiconductor crystal. This control has been achieved primarily by doping, which entails the introduction of impurity atoms that contribute additional carriers into the crystal lattice. However, while impurity doping in bulk semiconductors is now a routine, the doping of semiconductor nanoparticles is hard and complex. The nanometer size of colloidal quantum dot leads to new difficulties that are not encountered in bulk materials. For example, while a heavily doped bulk semiconductor typically has about 1 dopant for every $10^5$ atoms, a colloidal quantum dot with a 5 nm diameter has about fifteen hundred atoms, out of which a thousand atoms are not at the surface. Therefore, to introduce even a single impurity entity into each nanocrystal, the relative dopant level has to be increased by about two orders of magnitude. In addition, even if this dopant level can be achieved, a more important problem is that the impurity may tend to diffuse to the surface and even into the nanoparticle solid support material and/or surrounding matrix due to thermodynamic driving forces. This can occur because the impurity is always only a few lattice constants from the surface of the nanocrystal.

To date, most efforts aimed at attacking these problems have focused on doping II-VI semiconductor nanocrystals with metals such as Mn or Cu and other rare-earth elements. The main challenge in the synthesis of such doped nanocrystals has been to introduce the impurity into the core (i.e., not at the surface or interface) of the particle, without compromising the quality of the nanocrystals (i.e., high crystallinity, well controlled size, and small size distribution). Unfortunately, Mn doped semiconductor nanocrystals prepared by aqueous coprecipitation or inverse micelle methods suffer from low crystallinity and broad size distributions. While more monodispersed and highly crystalline colloidal quantum dots can be obtained by high temperature growth methods, the high temperature can also promote expulsion of the impurity from the core to the nanocrystal surface.

In principle, n-type and p-type semiconductor nanocrystals can be obtained by the conventional method of doping bulk semiconductor crystals, for example, with a heterovalent impurity such as B in Si or In in CdSe. However, this approach has not been successful in colloidal quantum dots to date, possibly due to difficulties in introducing the impurity, or in eliminating surface traps that can capture the carrier.

Thus, conventional growth techniques have failed in supplying a sufficient answer to the growing demand for high quality doped semiconductor nanocrystals. The present invention provides an effective alternative method for the introduction of extra carriers (i.e., electrons or holes) or spins. In the proposed spray methods, mostly kinetic aspects govern the process of solid nanoparticles generation, allowing doping of the nanocrystals with acceptors and donors, or paramagnetic centers.

Doping of semiconductors nanocrystals with paramagnetic centers introduces a localized spin into the nanocrystals. Such magnetic nanocrystals allow the study of spin-carrier or spin-spin interactions in the strongly quantum confined regime. Furthermore, they may also become interesting components for the new area of spintronics.

Diluted magnetic semiconductors (DMS) are semiconductor alloys whose lattice is made up in part of substitutional atoms that introduce extra spin. These semiconductors have rich optical and magnetical properties when Mn or other magnetic ions are doped into the material. The most extensively studied materials of this type are the $A^{II}_{1-x}Mn_xB^{VI}$ alloys in which the valence of the cation is identical to that of Mn. Diluted magnetic semiconductors of the $A^{II}_{1-x}Mn_xB^{VI}$ type are of interest for several distinct reasons. Their ternary nature makes it possible to tune the lattice constant and band parameters by varying the composition of the material. The magnetic interactions among the Mn spins are in this case dominated by antiferromagnetic direct exchange, and the systems show paramagnetic, antiferromagnetic or spin glass behavior. Furthermore, the presence of localized magnetic ions in these semiconductor alloys leads to an exchange interaction between the sp band electrons and the d electrons associated with Mn++, resulting in extremely large Zemman splittings of electronic (band and impurity) levels. This selective amplification of spin dependent properties leads to dramatic new effects, such as the giant Faraday rotation, the magnetic field induced metal insulator transition, and the formation of bound magnetic polarons.

In a $A^{III}_{1-x}Mn_xB^V$ material, due to the difference between the valence of $Mn^{2+}$ and the cation ($A^{3+}$), free carriers (holes) are generated in the valence band. These carriers mediate interactions that lead to long range ferromagnetic order among the Mn spins. Ferromagnetic semiconductors with transition temperatures, $T_c$ of up to −163° C. have been realized.

Diluted magnetic semiconductors nanocrystals (nanoparticles) are expected to exhibit even more exotic behavior, since spin-spin exchange interactions should be enhanced by the confinement of the electron and hole. However, more recently, an additional motivation was recognized. Diluted magnetic semiconductors nanocrystals can be used to study and manipulate a single spin (or small number of spins) that is trapped in a semiconductor quantum box. In addition to interesting physics, this possibility implies that DMS nanocrystals can provide a useful model system for the new field of spintronics.

Doping of semiconductors nanoparticles, for varying their conductivity, can be done by introducing impurities with a difference between their valance band or conduction band and the valance/conduction band of the semiconductor host. These impurities introduce energy levels within the band gap. An impurity that introduces an energy level near the conduction band would require very little thermal energy to excite electrons from this filled energy level to the conduction band. Thus, at about −223° C.-173° C., virtually all of the electrons in the impurity level are donated to the conduction band. Such an impurity level is called a donor level. The doped semiconductor that has considerable concentration of electrons in the conduction band is an n-type material. If an impurity introduces an energy level near the valence band, very little thermal energy is required to excite electrons from the valence band into the impurity level, leaving holes in the valence band. Since this type of impurity level accepts electrons from the valance band it is called acceptor level and the doped semiconductor is a p-type material. The ability to control the number of carriers and carriers type (electrons or holes) by means of doping with donors or acceptors enables modern semiconductor technology.

If it is hoped that semiconductor nanoparticles will be fully incorporated in the semiconductor technology industry as part of the global desire for miniaturization, doping of the nanoparticles must be enabled and perfected. This is a main goal of the present method.

According to another preferred embodiment of the present invention, collecting of unsupported semiconductor nanoparticles on solid support produces a highly closed packed array. The present method uniquely enables the production of free, uncoated semiconductor nanoparticles, in contrast to the main alternative, colloidal method. As a result, the method enables semiconductor nanoparticles organization on a solid support in the form of closed packed structure. Such structure is characterized by nanoparticles that are in physical contact with each other. Upon continued growth after the completion of a two-dimensional structure, even three-dimensional closed packed structures can be produced.

According to the present method, the temperature of the solid support should be controlled to eliminate any solvent vapor re-condensation that might dissolve again the collected semiconductor nanoparticles and hence alter their properties and size distribution. The physical properties of self-assembled nanoparticles can significantly differ from those of isolated nanoparticles. These changes in the physical properties are due to the close vicinity of nanoparticles at a given distance between each other. Arrays prepared by the method of the present invention have the potential of creating the densest possible structures due to the lack of organic capping. Electron transport properties as well as energy transfer mechanism, which drastically change with the semiconductor nanoparticle organization, can then be measured within new and more interesting range of inter-particle distances. Furthermore, the incorporation of n-type or p-type doped semiconductor nanocrystals into these arrays is expected to increase significantly the array conductivity.

In another embodiment of the invention, the collection of unsupported semiconductor nanoparticles on a solid support produces a three-dimensional array of the nanoparticles. Two and tree dimensional arrays of the collected unsupported semiconductor nanoparticles can be produced either by simple collection of the spray on various substrate targets or by using templates like alumina pores, pyramidal grooves or masks placed in the droplets' way. Well-controlled production of three-dimensional arrays can enable the formation of interesting structures such as alternating layers of different semiconductor nanoparticles. Aspects of array symmetry can then be examined, where the nanoparticles are used as building blocks of an artificial solid.

In another embodiment of the present invention, the unsupported semiconductor nanoparticles are characterized by having a core-shell structure, with materials, at least one of which is a semiconductor. Some non-limiting examples of core-shell structures are given herein below.

The nanoparticle formation process depends on the solubility of the semiconductor compounds used. The less soluble the semiconductor is, the faster it is expected to precipitate. As a result, a solution with two semiconductor compounds that differ in their solubility can be used in order to generate a core-shell structure (a non limiting example is CdS—ZnS). Overcoating a semiconductor nanoparticle with a second semiconductor material of wider band gap results in dramatic improvements in luminescence efficiency.

The semiconductor nanoparticles can also be overcoated with organic materials such as conductive polymers for improved incorporation of the nanoparticles into the polymer in future applications.

Another interesting possibility is the production of a core shell structure where the semiconductor material comprises the shell. Using cores of materials such as polystyrene or silica can results in photonic materials. Using metal nanoparticles as cores results in new and interesting materials for the microelectronics industry. Core-shell structures, wherein the semiconductor material comprises the shell, can be produced when the solution contains metal compound along with the semiconductor compound. The semiconductor, which is less soluble, would precipitate as a shell over a metal core. Alternatively, metal/polystyrene/silica nanoparticles can be produced elsewhere, (also commercially available) and incorporate into a solution with the semiconductor compound. In this method etch droplet must contain a single metal/polystyrene/silica nanoparticle. The semiconductor would precipitate over the accessible core.

In yet still another embodiment of the present invention, the solid support for collecting the unsupported semiconductor nanoparticles, is heated and maintained at a selected temperature.

Since the semiconductor nanoparticles production via spray is a droplet to particle conversion process, solvent evaporation is of main importance. Without supplying sufficient heat, spray droplets will condense on the substrate target. Droplets condensation can lead to particle resolution. Thus, the solvent must be fully evaporated before the droplets/nanoparticles are collected on the substrate target and the solid support must be heated to prevent re-solvation. This can easily be achieved when using thermospray at ambience temperatures. Some alternatives are heating the spray by heating the gas used for pneumatic assistance, heating the end of the capillary, or heating the droplets on their way from the nebulizer outlet to the solid support. However, on some occasions heating the solid support cannot be avoided. Furthermore the control of the temperature of the solid support can be essential for the proper control of the semiconductor nanoparticles features.

In accordance with another embodiment of the present invention, the spray droplets of the semiconductor salt solution are produced by an array of multiple tube spray sources. One of the colloidal syntheses downsides in producing semiconductor nanoparticles is the fact that the procedure is not continuous. This can be a major difficulty in scaling-up the process for commercial manufacturing. The epitaxial growth uses expensive and complex equipment that can threat the worthiness of the process. The spray method according to the present invention is both continuous and low cost. Production of the spray droplets of the semiconductor compound solution by an array of multiple tube spray sources is a convenient way for scaling-up the semiconductor nanoparticles production according to the present invention, although other alternative scale up methods can be conceived.

The invention will now be illustrated by the following non-limiting examples.

EXAMPLES

Example 1

Production of CdS Nanocrystals by Pneumatic Assisted Thermospray

Cadmium sulfide nanocrystals were intensively investigated in the past few years and thus serve as a good sample for demonstrating the method of the present invention.

Figures 1, 2:
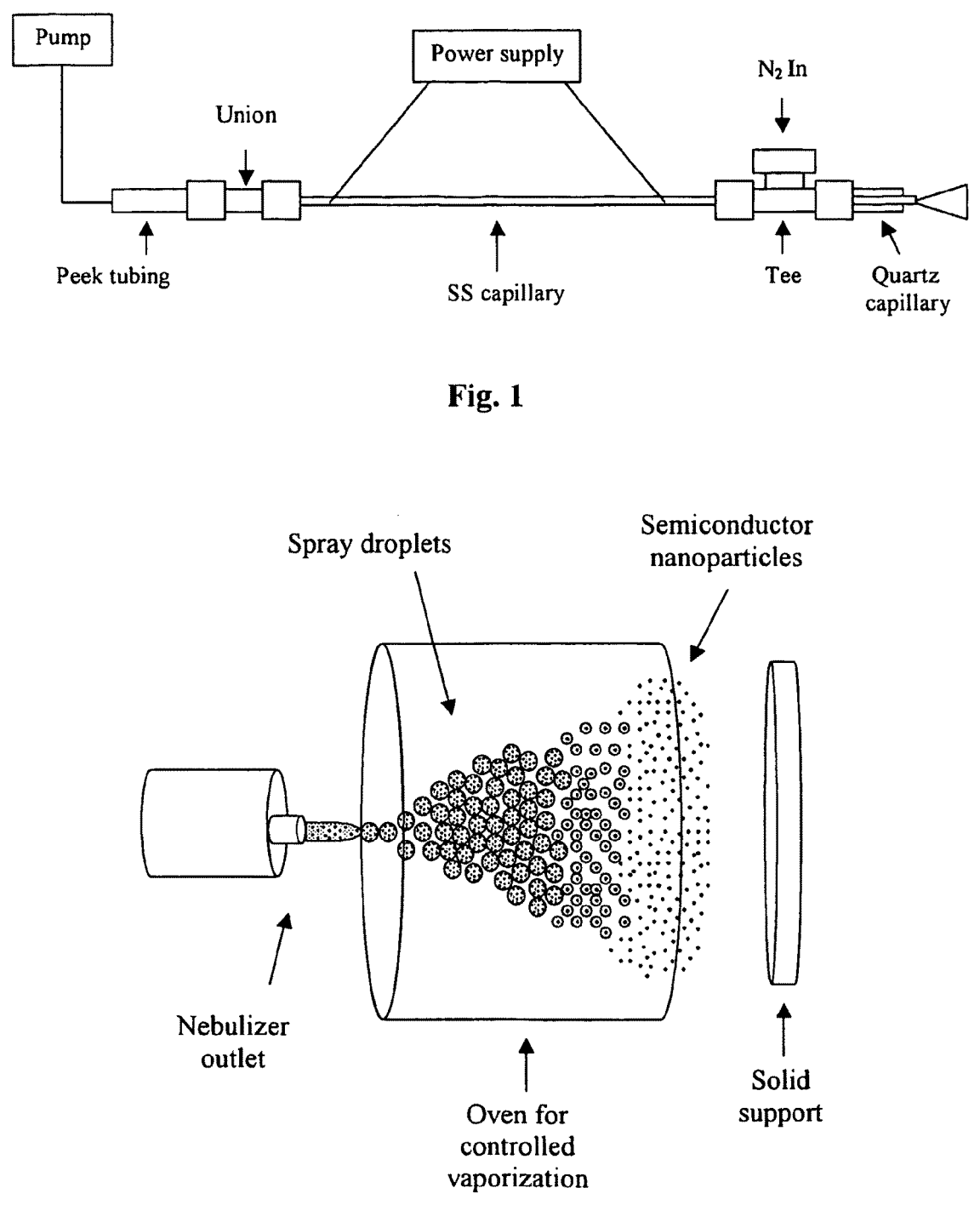

Cadmium sulfide powder (commercially available from Aldrich) was dissolved in HPLC grade methanol. Spray of droplets of the solution of cadmium sulfide was generated using pneumatic assisted thermospray. The thermospray apparatus employed a stainless steel capillary (0.005" ID, 0.020" OD, 20 cm long), with liquid pumped through it by an HPLC pump (model PU-1585, JASCO, Japan) and through a polyetheretherketone (PEEK) tubing (0.0025" ID, 1/16" OD). The PEEK tubing was connected to the stainless steel capillary by a PEEK union. A heating power supply (Manson NP-9613) was connected to two points on the capillary, by specially designed clamps. The positive point was located near the inlet side and the negative point was located about 8 cm further downstream. The length between these connections points could be easily varied and served as an experimental parameter for varying the droplets diameter. The capillary was then entered into a PEEK tee-shaped structure in order to supply a nitrogen gas flow for pneumatic assistance. The gas flew out of the tee, through a quartz tube surrounding the capillary. A Kanthal wire was looped on the quartz tube for heating the pneumatic gas, which flew in it. The pneumatic assisted thermospray apparatus is illustrated in FIG. 1.

Heating the air through which the spray passed on its way to the substrate target was achieved by using a small axially open oven. Upon vaporizing the solvent of the spray droplets, a steam of unsupported cadmium sulfide nanoparticles in the form of nanocrystals was produced, as illustrated in FIG. 2. The unsupported cadmium sulfide nanocrystals were collected either on a fused silica support for optical characterization or on an amorphous carbon coated copper grid for high resolution transmission electron microscopy analysis (HRTEM). The HRTEM analysis was carried out using a JEOL 3010UHR instrument operated at 300 KV. The HRTEM analysis revealed spherical, well-organized CdS nanocrystals. The average diameter of the CdS nanoparticles varied between 3 to 6 nanometers with a size standard deviation as low as five percents.

The HRTEM images of the two CdS nanocrystals, as shown in FIGS. 3A-3B, exhibits well resolved cubic lattice fringes. The fast Fourier transform pictures, shown in FIG. 4, confirm the formation of nanocrystals with a zinc blend cubic structure having a high degree of crystallinity.

Temperature dependence measurements conducted in the range of −269° C. to 27° C., showed no temperature dependence. This finding suggests that the light emission spectrum emerges from a single process most likely an excitonic recombination in a defect-free nanoparticle, which suggests that the CdS nanoparticles thus formed have a pure surface.

Example 2

Production of CdS Nanocrystals by Pneumatic Assisted Electrospray

Cadmium sulfide powder (commercially available from Aldrich) is dissolved in HPLC grade methanol. Spray of droplets of the solution of cadmium sulfide is generated using electrospray. The electrospray apparatus employs a stainless steal (SS) capillary (0.005" ID, 0.020" OD, 10 cm long, Upchurch), with liquid pumped through it by an HPLC pump (model PU-1585, JASCO) and through a PEEK tubing (0.0025" ID, 1/16" OD). The PEEK tubing is connected to the SS capillary by a PEEK union. A high-voltage power supply (Stanford, model PS 350) is connected to the outlet of the capillary. The capillary is then entered into a PEEK tee-shaped structure in order to supply a nitrogen gas flow for pneumatic assistance. The gas flows out of the tee through a quartz tube surrounding the capillary. A Kanthal wire is looped on the quartz tube and serves as a heating source. The spray is collected on the desired substrate, which serves as the counter-electrode, held at ground potential. In case a non-conductive substrate target is employed, the spray is passed through a variety of mesh and loops counter-electrodes.

CdS nanocrystals produced by the titled method are analyzed as described in example 1.

The pneumatic assisted electrospray apparatus is illustrated in FIG. 5.

The invention claimed is:

1. A method for producing semiconductor nanoparticles comprising:
   (i) dissolving a semiconductor compound or mixture of semiconductor compounds in a solution;
   (ii) generating spray droplets of the resulting solution of semiconductor compound(s);
   (iii) vaporizing the solvent of said spray droplets, consequently producing a stream of unsupported semiconductor nanoparticles, wherein each semiconductor nanoparticle is produced from a single spray droplet; and
   (iv) collecting said unsupported semiconductor nanoparticles on a support, optionally on a solid support.

2. The method according to claim 1, wherein said semiconductor compound or mixture of compounds is a salt or mixture of salts dissolved in said solution.

3. The method according to claim 2, wherein one or more metal oxide compounds are added to the solution.

4. The method according to claim 1, further characterized in that said collected semiconductor nanoparticles on said solid support are ordered nanocrystals.

5. The method according to claim 1, wherein said semiconductor nanoparticles have a diameter of more than 0.5 nm and less than 30 nm.

6. The method according to claim 1, wherein said semiconductor nanoparticles diameters are monodispersed with diameter standard deviation of less than 20%.

7. The method according to claim 1, wherein said semiconductor nanoparticles average size and size distribution are controlled by spray production parameters.

8. The method according to claim 1, wherein said semiconductor nanoparticles average size and size distribution are controlled by the semiconductor compound concentration in said solution.

9. The method according to claim 1, wherein said spray droplets are generated by thermospray.

10. The method according to claim 9, wherein said thermospray is based on direct electrical heating of said solution by passing an electrical current through a capillary through which said solution is passing.

11. The method according to claim 1, wherein said spray droplets are generated by electrospray.

12. The method according to claim 1, wherein said spray droplets are generated by pneumatic nebulization.

13. The method according to claim 1, wherein said spray droplets are generated by pneumatic assisted thermospray.

14. The method according to claim 1, wherein each said semiconductor nanoparticle is produced by solvent evaporation during the flight of the spray droplet as unsupported single drop, through a gradual compound inner-droplet precipitation.

15. The method according to claim 1, wherein said semiconductor nanoparticles are pure semiconductor.

16. The method according to claim 1, wherein said semiconductor nanoparticles are doped.

17. The method according to claim 16, wherein said semiconductor nanoparticles are doped with paramagnetic centers.

18. The method according to claim 16, wherein said semiconductor nanoparticles are doped with extra carriers.

19. The method according to claim 1, wherein said semiconductor nanoparticles are diluted magnetic semiconductors.

20. The method according to claim 1, wherein said collecting said unsupported semiconductor nanoparticles on a solid support, produces a two dimensional array of said nanoparticles.

21. The method according to claim 1, wherein said collecting said unsupported semiconductor nanoparticles on a solid support, produces a highly closed packed two-dimensional array.

22. The method according to claim 1, wherein said collecting said unsupported semiconductor nanoparticles on a solid support, produces a three dimensional array of said nanoparticles.

23. The method according to claim 1, wherein said collecting said unsupported semiconductor nanoparticles on a solid support produces a closed packed three dimensional array of said nanoparticles.

24. The method according to claim 1, wherein said semiconductor nanoparticles are characterized by having a core-shell structure with materials, at least one of which is a semiconductor.

25. The method according to claim 1, wherein said solid support is heated and maintained at a controlled selected temperature.

26. The method according to claim 1, wherein said spray droplets of said solution of semiconductor is produced by an array of multiple tube spray sources.

* * * * *